United States Patent [19]
Bopp

[11] Patent Number: 4,799,571
[45] Date of Patent: Jan. 24, 1989

[54] MOTOR VEHICLE TRANSMISSION MOUNTING SYSTEM

[75] Inventor: Stefan Bopp, Esslingen, Fed. Rep. of Germany

[73] Assignee: Daimler-Benz Aktiengesellschaft, Stuttgart, Fed. Rep. of Germany

[21] Appl. No.: 106,225

[22] Filed: Oct. 9, 1987

[30] Foreign Application Priority Data

Nov. 4, 1986 [DE] Fed. Rep. of Germany ....... 3637522

[51] Int. Cl.⁴ .................. B60K 5/04; B60K 17/22
[52] U.S. Cl. .................. 180/294; 180/297; 180/312; 248/638; 267/141.7
[58] Field of Search .............. 180/292, 294, 297, 312; 248/635, 638, 659; 267/141.2, 141.3, 141.7

[56] References Cited

U.S. PATENT DOCUMENTS

| | | | |
|---|---|---|---|
| 1,180,715 | 4/1916 | Heaslet | 74/713 |
| 2,028,551 | 1/1936 | Lord | 180/292 X |
| 2,215,743 | 9/1940 | Saurer | 248/659 X |
| 2,254,282 | 9/1941 | Griswold | 180/312 |
| 4,240,517 | 12/1980 | Harlow, Jr. et al. | 180/297 X |

FOREIGN PATENT DOCUMENTS

| | | |
|---|---|---|
| 729937 | 1/1943 | Fed. Rep. of Germany . |
| 3309152 | 9/1984 | Fed. Rep. of Germany . |
| 431874 | 7/1935 | United Kingdom ................ 180/292 |
| 2131367 | 6/1984 | United Kingdom . |

Primary Examiner—David M. Mitchell
Assistant Examiner—Brian L. Johnson
Attorney, Agent, or Firm—Barnes & Thornburg

[57] ABSTRACT

A vehicle axle transmission is located between inwardly protruding wall indentations of a chassis trough-shaped bodywork of the vehicle structure and is retained by acceptance elements which are mounted to and inserted from the outside into these wall indentations into casing parts of the axle transmission such that it becomes unnecessary either to arrange and work on the corresponding transmission bearings or to carry out the necessary assembly and dismantling work within the chassis trough.

21 Claims, 2 Drawing Sheets

MOTOR VEHICLE TRANSMISSION MOUNTING SYSTEM

BACKGROUND AND SUMMARY OF THE INVENTION

The invention concerns a motor vehicle axle transmission mounting system which is located within a trough-shaped self-supporting bodywork chassis between vehicle bodywork side walls located between driven wheels of a vehicle axle having independent wheel suspensions.

A motor vehicle is already known from DE-PS No. 729 937 which has a driven vehicle axle between the wheels of which is located, at low level, a trough-shaped, self-supporting bodywork. In this case, the driven vehicle axle forms a rigid axle whose body accepting the axle transmission is integrated in the bodywork so that the floor of the trough of the bodywork is located underneath the axle body and where the axle tunnel accepting the axle shafts penetrate the bodywork side walls and are held in the latter.

This design excludes, inter alia, a sprung arrangement of bodywork and driven vehicle axle and is suitable for agricultural vehicles.

A motor vehicle with an arrangement of a driven vehicle axle on a trough-shaped bodywork provided at a low level, which permits sprung movements of the vehicle wheels and which has an axle transmission mounting system which is located within a trough-shaped self-supporting bodywork chassis between vehicle bodywork side walls located between driven wheels of a vehicle axle having independent wheel suspensions is known from DE-OS No. 33 09 152. For this purpose, the vehicle axle is equipped with independent wheel suspension so that the axle transmission necessary for driving the axle wheels has to be installed within the bodywork because of its low level and the axle shafts to be driven by the axle transmission have to be fed through the bodywork side walls.

The object of the invention is to make possible rapid and exact execution of the assembly and removal of the axle transmission within the trough-shaped bodywork while, however, avoiding an arrangement of mounting and/or supporting devices for the axle transmission which have to be provided on the inside of the bodywork floor and/or bodywork side walls and require special procedures.

This objective is achieved, according to the invention, by having the axle transmission be secured solely by acceptance elements means which are engaged in recesses means of casing part means of the axle transmission and insertable from the outside of the bodywork into a wall opening and wherein the casing part means are located between the bodywork side walls.

The design according to the invention makes it possible to insert the acceptance elements, provided for accepting the axle transmission, from outside the bodywork into the wall penetrations of the bodywork side walls provided for the location of the acceptance elements and to bring the acceptance elements into engagement with the recess means provided in the casing parts of the axle transmission. The acceptance elements thus form mounting elements to fix the axle transmission in a precise installation position within the bodywork without corresponding measures for this purpose having to be present within the bodywork.

The installation space for the axle transmission can thus be very tightly dimensioned because its mounting points do not have to be accessible within the bodywork.

A preferred embodiment of the invention has the acceptance elements means utilizing holding pins means which have a pin front end which contracts conically and engages in the complementary recess means o? the casing parts of the axle transmission. This makes possible and simultaneously imposes self-adjustment of the axle transmission within the bodywork, when the acceptance elements are brought into engagement with their corresponding casing parts. The adjustment of mounting acceptance features can therefore be avoided even in the case of repeated axle transmission assembly. For this purpose, the acceptance elements, arranged in the openings of the mutually opposite side walls of the bodywork side walls, define an obtuse angle ($\alpha$) closing towards the top in a plane at right angles to a longitudinal direction of the vehicle.

In order to compensate for manufacturing tolerances, for purposes of noise reduction due to vibration through the cooperating mounting elements, and for elastic-suspension of the axle transmission, an arrangement of rubber thrust mountings mounted into recesses of the casing parts is recommended. In order to avoid torque-induced pitch motions of the axle transmission and for the purpose of exact alignment during its installation, it useful to have two casing parts on each side of the transmission located adjacent to one another and separated along a longitudinal distance of the vehicle.

The arrangement of the axle transmission wherein the transmission is located between inwardly protruding wall indentations of the bodywork side walls permits simple assembly of the axle transmission, as well as, protected accommodation of the transmission-side links of an axle shaft, designed as a cardan shaft, within the wall indentations on the outsides of the bodywork. Also, the employment of relatively long axle shafts permit correspondingly large deflection angles between the acceptance means.

Where the bodywork side walls extend obliquely from the bottom of the vehicle upwards and outwards, particular assembly and manufacturing advantages can be achieved if the external surface of the all indentations supporting the axle transmission by means of the acceptance elements are, substantially flat and parallel to the external surface of a substantially flat part of the bodywork side walls and if the centerlines of the acceptance elements are at right angles to the external surface of the wall indentations. By this means, the necessary work on the external surface of the chassis indentations, used for mounting the acceptance elements in the chassis indentations, can take place in a holding fixture of the trough-shaped bodywork which is provided for the main work on the corresponding outer side wall surface parts.

These and other objects, features, and advantages of the present invention will become more apparent from the following description when taken in connection with the accompanying drawings which show, for the purposes of illustration only, one embodiment in accordance with the present invention, and wherein:

BRIEF DESCRIPTION OF THE DRAWINGS

FIG. 4 shows a view in the direction of the arrow A of FIG. 3.

DETAILED DESCRIPTION OF THE DRAWINGS

Figure 1:
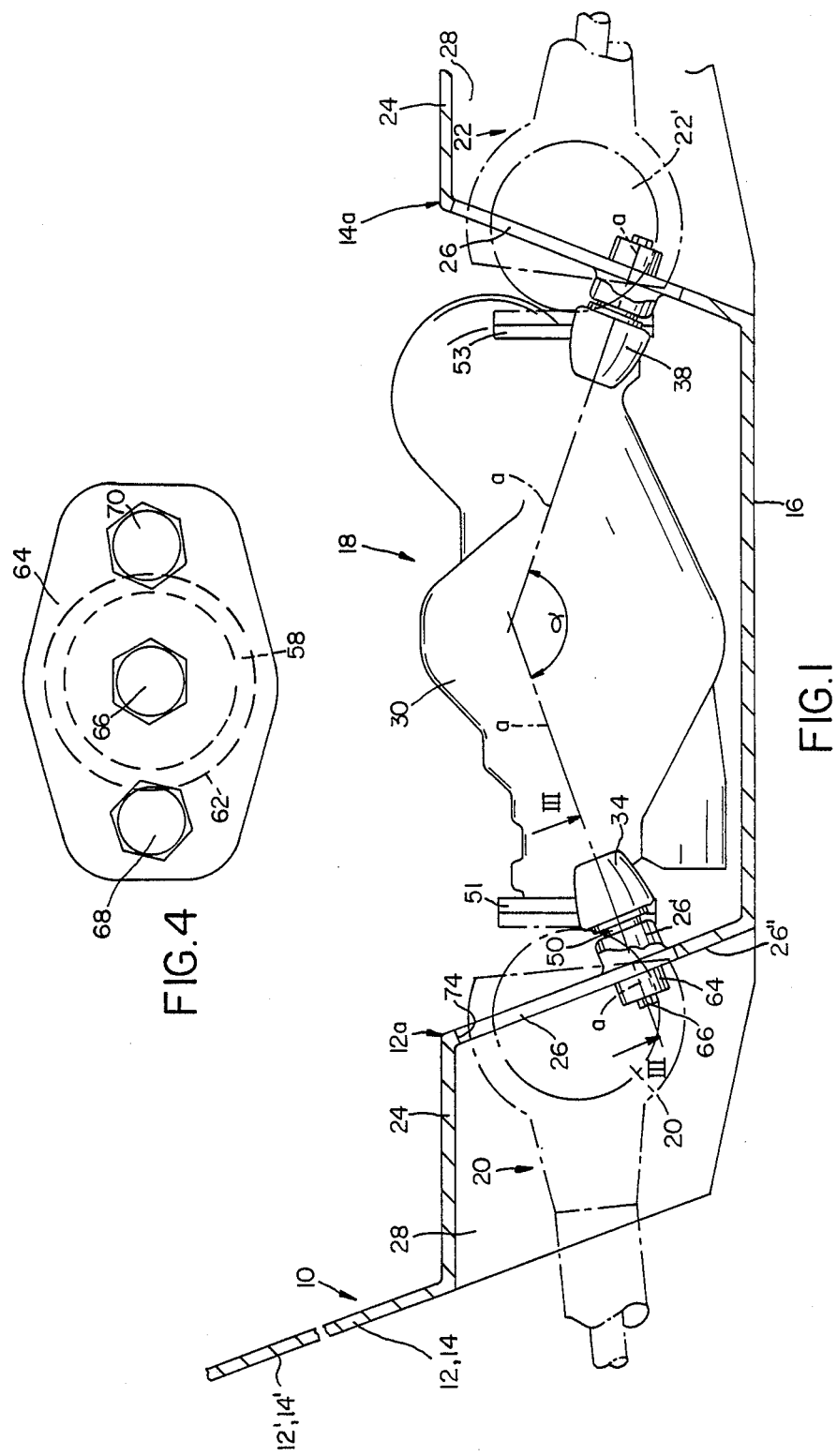
FIG. 1 shows a cross-section of the lower part of a trough-shaped, self-supporting bodywork in which an axle transmission of a driven axle is installed.

Referring now to the drawings wherein like reference numerals are used to designate like parts and more particularly to FIG. 1, a trough-shaped self-supporting bodywork of a motor vehicle is generally indicated by 10. The bodywork has side walls 12, 14 which are generally flat and extend obliquely from the bottom upwards and outwards. The side walls are closed by a bodywork floor 16.

The wheels (not shown) of the vehicle axles are individually suspended to the sides of the bodywork 10. At least one vehicle axle can be driven. For this purpose, the vehicle axle is equipped with an axle transmission 18 which, via axle shafts in the form of double cardan shafts 20, 22 leading transversely away from the axle transmission 18, drives the wheels associated with this vehicle axle.

As seen from FIG. 1, the axle transmission 18 is preferably supported immediately above the bodywork floor 16 between two wall indentations 12a, 14a in the bodywork side walls 12, 14 such that all the structure necessary for its acceptance, adjustment and securement can be easily carried out from outside the bodywork 10.

The wall indentations 12a, 14a are formed by an upper wall part 24, a side wall part 26 adjacent to the axle transmission 18 and by end wall parts. An indentation space 28 which is accessible from the outside of the bodywork 10 is created by all these wall parts.

The axle transmission 18 is preferably supported by two casing parts 32, 34 and 36, 38 (FIG. 2) in the form of mounting eye sockets, per wall indentation 12a or 14a. When viewed in the longitudinal direction of the vehicle, these eyes are provided at a transverse distance apart and in a common longitudinal place and which are opposite each other. These eyes are attached, in each case, to the side wall parts 26 of the wall indentations 12a or 14a. The eyes are formed on a casing 30 of the transmission unit 18 (FIG. 2) and are each equipped with a conical rubber thrust mounting 40 (FIG. 3), which comprises an internal bushing 44, sitting in a rubber lining 42 and also carries a rubber support 48 forming an additional spring on the outside of its bushing floor 46.

An acceptance element in the form of a circular cross-section mounting pin 50 is associated with each of the casing parts forming mounting eyes, 32, 34, 36, 38. These mounting pins 50 are located so that they can be axially displaced and can be fixed in pairs on one of the side wall parts 26 of the wall indentations 12a, 14a, in a wall opening 52 provided in correspondingly thickened wall sections 26' of the side wall part 26.

A front end 54 of the mounting pin 50, protruding on the transmission side from the thickened wall section 26', is designed to be complementary to the conical shape of the mounting internal bush 44 of the associated rubber thrust mounting 40 and engages in the latter so as to make a positive connection with axial preloading of the rubber thrust mounting 40.

The mounting preloading or the distance w between the rubber support 48 and the mounting eye inner surface 56 can be adjusted by at least one spacer ring 58 whose thickness can be determined by means of an adjustment device. A spacer ring 58 of this type is supported on the rear pin end surface 60 and is located in a recess 62, accepting the end 50' of the cylindrical mounting pin 50, of a pin fastening flange 64. The fastening flange is, on the one hand, clamped by means of a clamping screw 66 to the mounting pin 50 and, on the other hand, is bolted up tight by means of fastening bolts 68, 70 (FIG. 4) to the plane external surface 26'' of the side wall part 26.

As may be seen from FIG. 1, the mounting pins 50, associated in pairs with each side wall part 26, are located in a plane a—a preferably located at a small distance under the transmission output drive 51, 53 for the double cardan shafts 20, 22 and at right angles to the longitudinal axis of the vehicle. Both planes a—a are set obliquely to the horizontal by the same angle in such a way that they define an obtuse angle ($\alpha$) of preferable 140°.

Figure 2:
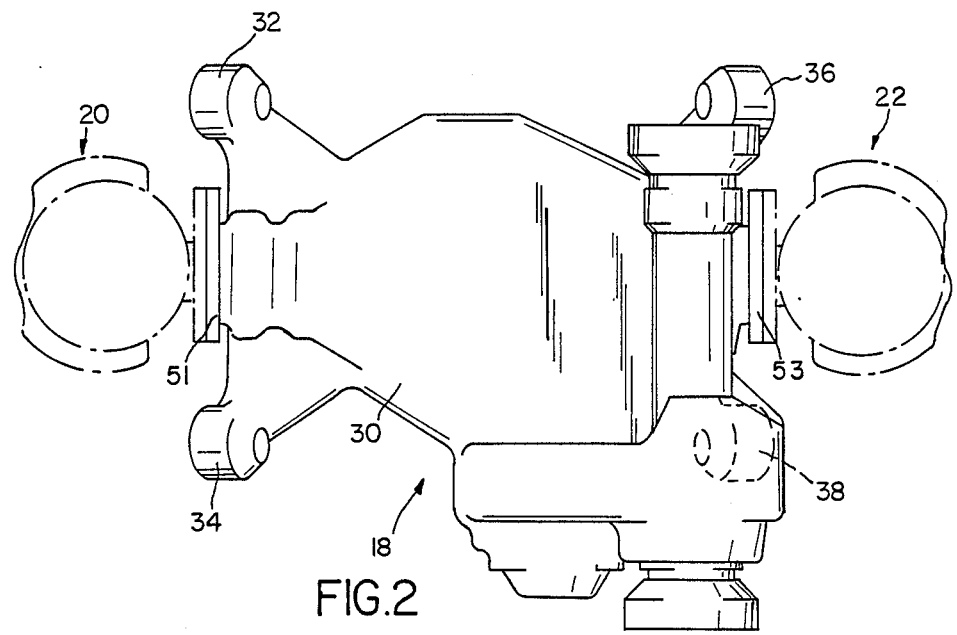
FIG. 2 shows a plan view of the casing of the axle transmission.
Figure 3:
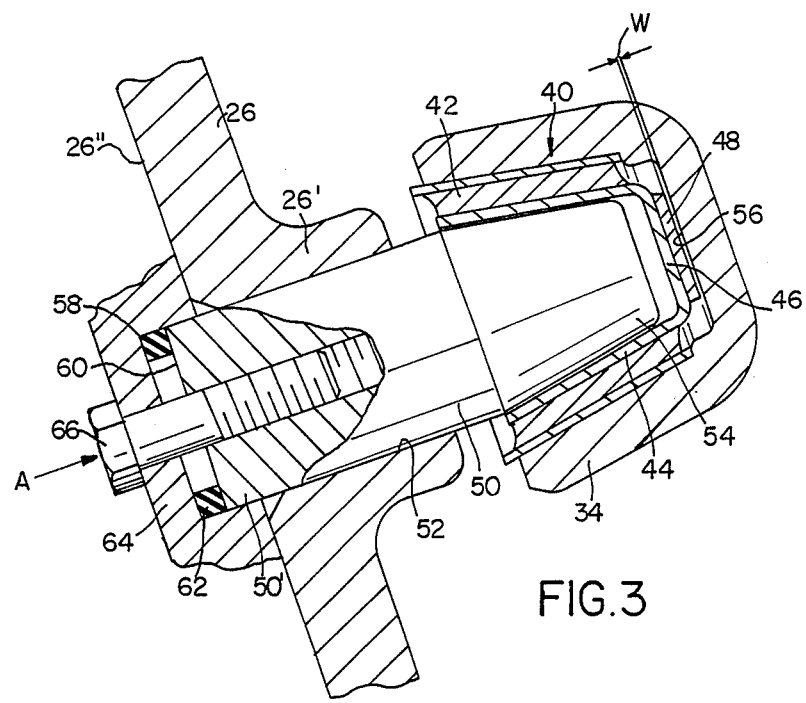
FIG. 3 shows a partial section along the line III—III of FIG. 1, to a larger scale than FIG. 1.

As is shown in FIG. 2, the transmission output drives 51, 53 are each located between the casing parts 32, 34 or 36, 38, arranged in pair relative to one another. In accordance with this, the side wall parts 26 of the wall indentations 12a, 14a are penetrated by an opening recess 74 (FIG. 1) through each of which, one of the double cardan shafts 20, 22 extends with its transmission-side shaft links 20' or 22'. It is therefore clear that the space 28 formed by the wall indentations 12a, 14a and accessible from the outside also accepts and encloses the shaft links 20', 22' and therefore offers effective protection from external effects.

FIG. 1 shows that the side wall parts 26 of the wall indentations 12a, 14a extend obliquely from the bottom upwards and outwards and, in fact, substantially parallel to the associated bodywork side wall 12 or 14. Because of this, it is possible to face and drill the external surface 26'' of the side wall part 26 together with the outer main working surface 12' or 14' in a holding fixture of the trough-shaped bodywork 10 in order to produce the wall opening 52 in the thickened portion 26' as well as the threaded holes for the fastening bolts 68, 70 and the recess 74.

For the supporting of the axle transmission 18, the mounting pins 50 on the side wall parts 26 of the wall indentations 12a, 14a can be reached from outside, or within the space 28, so that corresponding work within the bodywork becomes unnecessary.

For assembling and disassembling of the axle transmission, the transmission 18 is hoisted by any conventional means (not shown) so that the mounting pins 50 can be properly inserted into the cooperating recesses in the transmission.

While I have shown and described only one embodiment in accordance with the present invention, it is understood that the same is not limited thereto but is susceptible to numerous changes and modifications as known to one having ordinary skill in the art, and I therefore do not wish to be limited to the details shown and described herein, but intend to cover all such modifications as are encompassed by the scope of the appended claims.

What is claimed:

1. A motor vehicle axle transmission mounting system wherein a transmission is located within a trough-shaped self-supporting bodywork chassis between vehicle bodywork side walls located between driven wheels of a vehicle axle having independent wheel suspensions, wherein the axle transmission is secured solely by acceptance element means which are engaged in socket means of casing part means of the axle transmission and wherein said accepting element means are secured outside of the bodywork side walls and extend through openings therein, and wherein the casing part means are located between the bodywork side walls.

2. The motor vehicle axle transmission mounting system according to claim 1, wherein the acceptance element means utilize holding pins means which have a pin end which contracts conically and engages in the complementary formed socket means of the casing part means of the axle transmission.

3. The motor vehicle axle transmission mounting system according to claim 1, wherein centerlines of the acceptance element means located in the openings of the mutually opposite side walls of the bodywork side walls define an obtuse angle ($\alpha$) in a plane at right angles to a longitudinal direction of the vehicle.

4. The motor vehicle axle transmission mounting system according to claim 2, wherein centerlines of the acceptance element means located in the openings of the mutually opposite side walls of the bodywork side walls define an obtuse angle ($\alpha$) in a plane at right angles to a longitudinal direction of the vehicle.

5. The motor vehicle axle transmission mounting system according to claim 1, wherein the socket means of the casing part means of the axle transmission are located within an internal bushing of a rubber thrust mounting located in the casing part means.

6. The motor vehicle axle transmission mounting system according to claim 2, wherein the socket means of the casing part means of the axle transmission are located within an internal bushing of a rubber thrust mounting located in the casing part means.

7. The motor vehicle axle transmission mounting system according to claim 3, wherein the socket means of the casing part means of the axle transmission are located within an internal bushing of a rubber thrust mounting located in the casing part means.

8. The motor vehicle axle transmission mounting system according to claim 1, wherein the axle transmission is held, on one of its casing part means facing towards one bodywork side walls by two acceptance element means located adjacent to one another along a distance longitudinally of the vehicle to avoid tilting movement of the transmission caused by torque induced pitch motions.

9. The motor vehicle axis transmission mounting system according to claim 2, wherein the axle transmission is held, on one of its casing part means facing towards one bodywork side walls by two acceptance element means located adjacent to one another along a distance longitudinally of the vehicle to avoid tilting movement of the transmission caused by torque induced pitch motions.

10. The motor vehicle axle transmission mounting system according to claim 3, wherein the axle transmission is held, on one of its casing part means facing towards one bodywork side walls by two acceptance element means located adjacent to one another along a distance longitudinally of the vehicle to avoid tilting movement of the transmission caused by torque induced pitch motions.

11. The motor vehicle axle transmission mounting system according to claim 4, wherein the axle transmission is held, on one of its casing part means facing towards one bodywork side walls by two acceptance element means located adjacent to one another along a distance longitudinally of the vehicle to avoid tilting movement of the transmission caused by torque induced pitch motions.

12. The motor vehicle axle transmission mounting system according to claim 1, wherein the axle transmission is located between inwardly protruding wall indentations of the bodywork side walls.

13. The motor vehicle axle transmission mounting system according to claim 2, wherein the axle transmission is located between inwardly protruding wall indentations of the bodywork side walls.

14. The motor vehicle axle transmission mounting system according to claim 3, wherein the axle transmission is located between inwardly protruding wall indentations of the bodywork side walls.

15. The motor vehicle axle transmission mounting system according to claim 4, wherein the axle transmission is located between inwardly protruding wall indentations of the bodywork side walls.

16. The motor vehicle axle transmission mounting system according to claim 5, wherein the axle transmission is located between inwardly protruding wall indentations of the bodywork side walls.

17. The motor vehicle axle transmission mounting system according to claim 12, wherein the bodywork side walls extend obliquely from the bottom of the vehicle upwards and outwards thereof with an external surface of the wall indentations being substantially flat and parallel to an external surface of a substantially flat wall part of the bodywork side walls and wherein centerlines of the acceptance element means are at right angles to the external surface of the wall indentations.

18. The motor vehicle axle transmission mounting system according to claim 13, wherein the bodywork side walls extend obliquely from the bottom of the vehicle upwards and outwards thereof with an external surface of the wall indentations being substantially flat and parallel to an external surface of a substantially flat wall part of the bodywork side walls and wherein centerlines of the acceptance element means are at right angles to the external surface of the wall indentations.

19. The motor vehicle axle transmission mounting system according claim 8, wherein the acceptance element means are arranged in pairs relative to one another and are provided in each bodywork side wall at a height of a transmission output drive for an axle shafts forming a cardan shaft and wherein each transmission output drive is located between a pair of casing part means with each casing part means accepting one of the acceptance element.

20. The motor vehicle axle transmission mounting system according claim 12, wherein the acceptance element means are arranged in pairs relative to one another and are provided in each bodywork side wall at a height of a transmission output drive for an axle shafts forming a cardan shaft and wherein each transmission output drive is located between a pair of casing part means with each casing part means accepting one of the acceptance element.

21. The motor vehicle axle transmission mounting system according to claim 1, wherein the acceptance element means is axially displaceable into and out of the socket means.

* * * * *